(12) United States Patent
Huang et al.

(10) Patent No.: US 9,347,584 B2
(45) Date of Patent: May 24, 2016

(54) GAS REGULATOR

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 120 days.

(21) Appl. No.: 14/260,117

(22) Filed: Apr. 23, 2014

(65) Prior Publication Data

US 2015/0107710 A1    Apr. 23, 2015

(30) Foreign Application Priority Data

Oct. 18, 2013 (TW) .............................. 102137721 A

(51) Int. Cl.
*F16K 37/00* (2006.01)
*F16K 15/14* (2006.01)

(52) U.S. Cl.
CPC .............. *F16K 37/005* (2013.01); *F16K 15/145* (2013.01); *F16K 37/0025* (2013.01); *F16K 37/0033* (2013.01); *F16K 37/0041* (2013.01); *Y10T 137/7895* (2015.04); *Y10T 137/8326* (2015.04)

(58) Field of Classification Search
CPC .............. F16K 37/005; F16K 37/0025; F16K 37/0033; F16K 37/0041
USPC ..................... 137/505.38, 553, 554, 556, 557
See application file for complete search history.

(56) References Cited

U.S. PATENT DOCUMENTS

| | | | | |
|---|---|---|---|---|
| 3,859,619 A * | 1/1975 | Ishihara | .............. | F16K 37/0033 137/554 |
| 5,542,287 A * | 8/1996 | Powers | ............... | G01M 3/2815 340/626 |
| 6,441,744 B1 * | 8/2002 | Adams | .................... | G01F 1/363 137/551 |
| 6,505,640 B1 * | 1/2003 | Lin | ..................... | G05D 16/0686 137/315.05 |
| 6,830,061 B2 * | 12/2004 | Adams | ................. | G05D 7/0635 137/12 |
| 7,969,146 B2 * | 6/2011 | Christianson | ....... | F16K 37/0033 324/207.2 |

* cited by examiner

*Primary Examiner* — Mary McManmon
*Assistant Examiner* — Richard K Durden
(74) *Attorney, Agent, or Firm* — Ming Chow; Sinorica, LLC

(57) ABSTRACT

A gas regulator includes a valve block, a pressure regulating assembly, and a metal coil. The valve block includes an input gateway, an output gateway, and a pressure reducing chamber. The metal coil is provided in the pressure reducing chamber. The pressure regulating assembly includes a membrane provided in the pressure reducing chamber, a movable member connected to the membrane, and a shielding member connected to the movable member, wherein the movable member has a magnetic element received in the metal coil. The membrane deforms with gas pressure changes of a connected gas source, and makes the movable member move the shielding member to change an output gas flow of the input gateway. The magnetic element is then moved relatively to the metal coil to generate an induced emf, which precisely indicates the gas pressure changes of the gas source.

9 Claims, 7 Drawing Sheets

GAS REGULATOR

The current application claims a foreign priority to the patent application of Taiwan No. 102137721 filed on Oct. 18, 2013.

BACKGROUND OF THE INVENTION

1. Technical Field

The present invention relates generally to a gas regulator, and more particular to a gas regulator which indicates a gas pressure of a gas source.

2. Description of Related Art

A gas regulator is a device set between a gas source and a gas appliance, and is used for regulating a gas pressure, and to provide the gas appliance a stable gas supply. FIG. 1 shows a conventional gas regulator 1, which includes a valve block 12 and a pressure regulating assembly 14.

The valve block 12 has an input gateway 122, an output gateway 124, and a pressure reducing chamber 126. The input gateway 122 is connected to a gas source such as a gas barrel (not shown), and the output gateway 124 is connected to a gas appliance (not shown). The pressure regulating assembly 14 is provided in the pressure reducing chamber 126, including a membrane 142, a spring 144, a movable member 146, and a shielding member 148. The membrane 142 divides the pressure reducing chamber 126 into a first sub-chamber 126a and a second sub-chamber 126b, wherein the first sub-chamber 126a communicates the input gateway 122 with the output gateway 124. The spring 144 urges the valve block 12 and the membrane 142. The movable member 146 is connected to the membrane 142. The shielding member 148 is pivoted on the valve block 12 and is connected to the movable member 146. The shielding member 148 has a shielding portion 148a, which is in association with the input gateway 122. Whereby, if a gas pressure in the gas barrel is lowering, a gas pressure in the first sub-chamber 126a is reduced as well, which makes the spring 144 push the membrane 142 downwardly to gradually move the shielding portion 148a of the shielding member 148 away from the input gateway 122. As a result, an output gas flow of the input gateway 122 is becoming larger for compensating the lowering gas pressure in the gas barrel, and therefore a gas pressure of gas provided to the gas appliance is maintained stable.

Although the conventional gas regulator 1 has the function of regulating gas pressure, it is not able to indicate the gas pressure of the gas source, which limits the usages of the gas regulator 1.

BRIEF SUMMARY OF THE INVENTION

In view of the above, the primary objective of the present invention is to provide a gas regulator, which indicates gas pressure changes of the gas source.

The present invention provides a gas regulator set between a gas source and a gas appliance, which includes a valve block, a membrane, a metal coil, a movable member, and a shielding member. The valve block includes an input gateway, an output gateway, and a pressure reducing chamber, wherein the input gateway communicates with the gas source, and the output gateway communicates with the gas appliance; the membrane is provided in the pressure reducing chamber, which divides the pressure reducing chamber into a first sub-chamber and a second sub-chamber, wherein the first sub-chamber communicates the input gateway with the output gateway, and the membrane deforms due to a change of a pressure in the first sub-chamber; the metal coil is provided in either the first sub-chamber or the second sub-chamber; the movable member has a magnetic element received in the metal coil, wherein the movable member is connected to the membrane, and is moved relatively to the metal coil when the membrane deforms; and the shielding member is provided in the first sub-chamber, wherein the shielding member is moved by the membrane to change an output gas flow of the input gateway.

With such design, when the gas pressure of the gas source changes, the metal coil generates an induced emf because of being affected by magnetism of the magnetic element, which is able to precisely indicate the gas pressure changes of the gas source.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
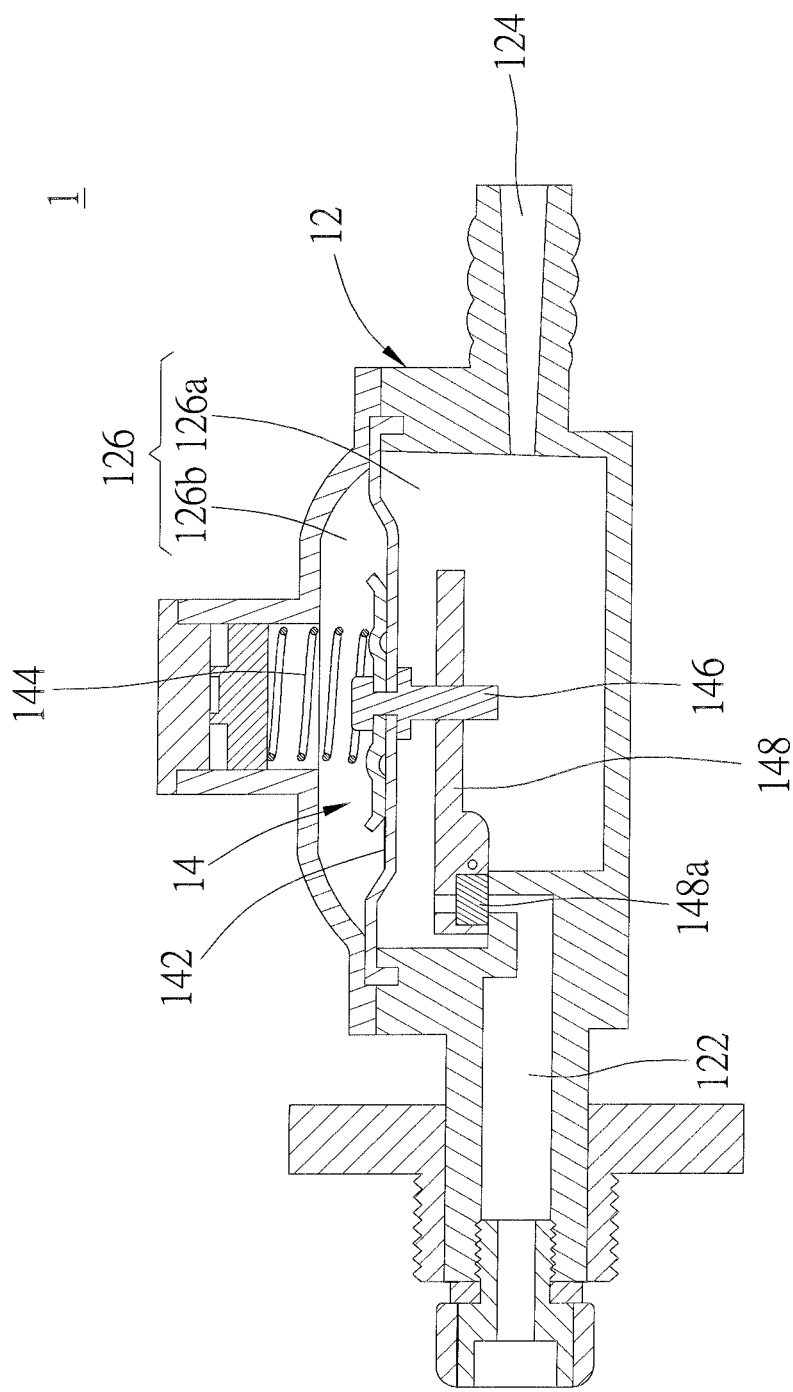
FIG. 1 is a sectional view of the conventional gas regulator.
Figure 2:
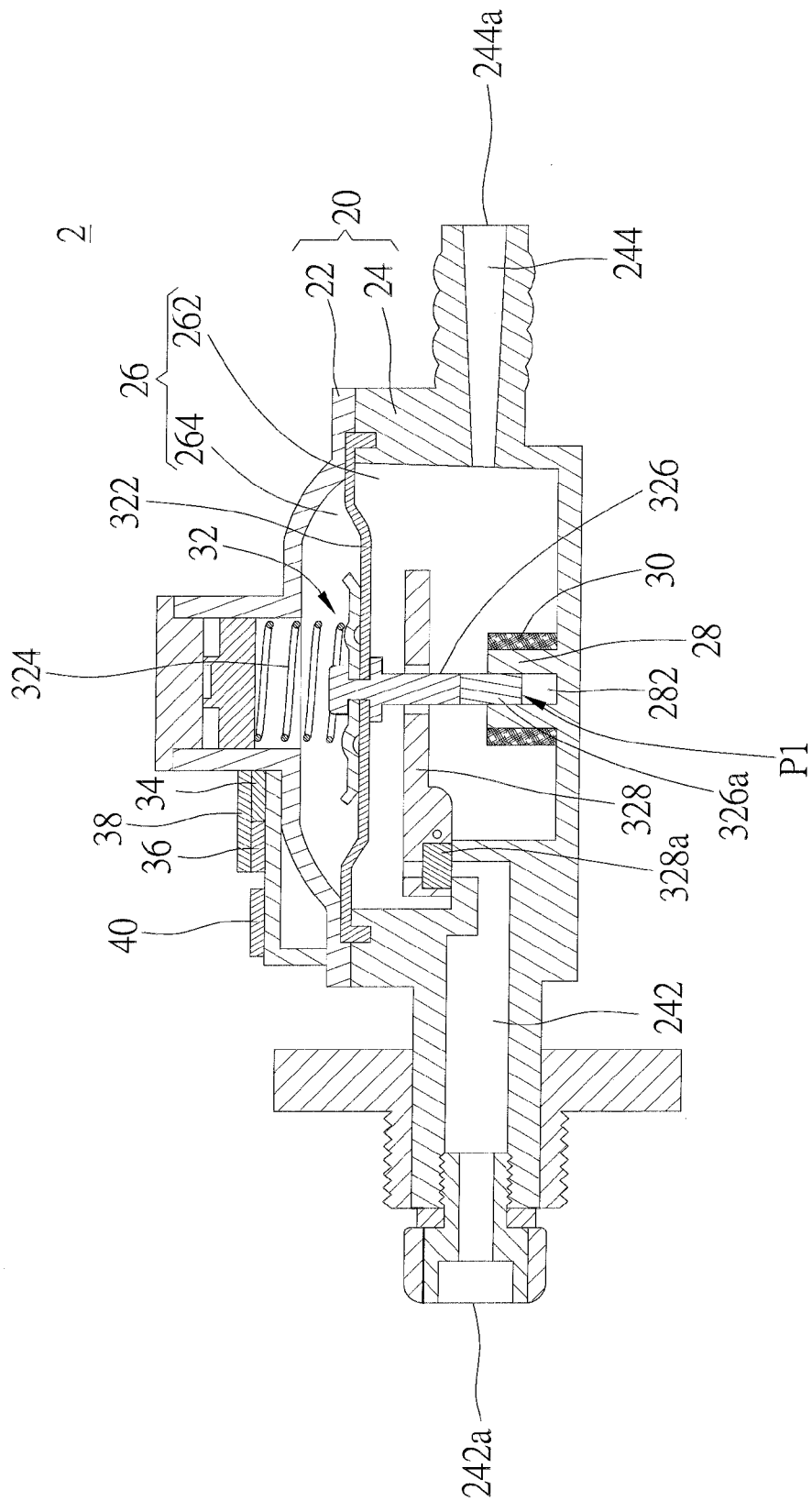
FIG. 2 is a sectional view of a first preferred embodiment of the present invention.
Figure 3:
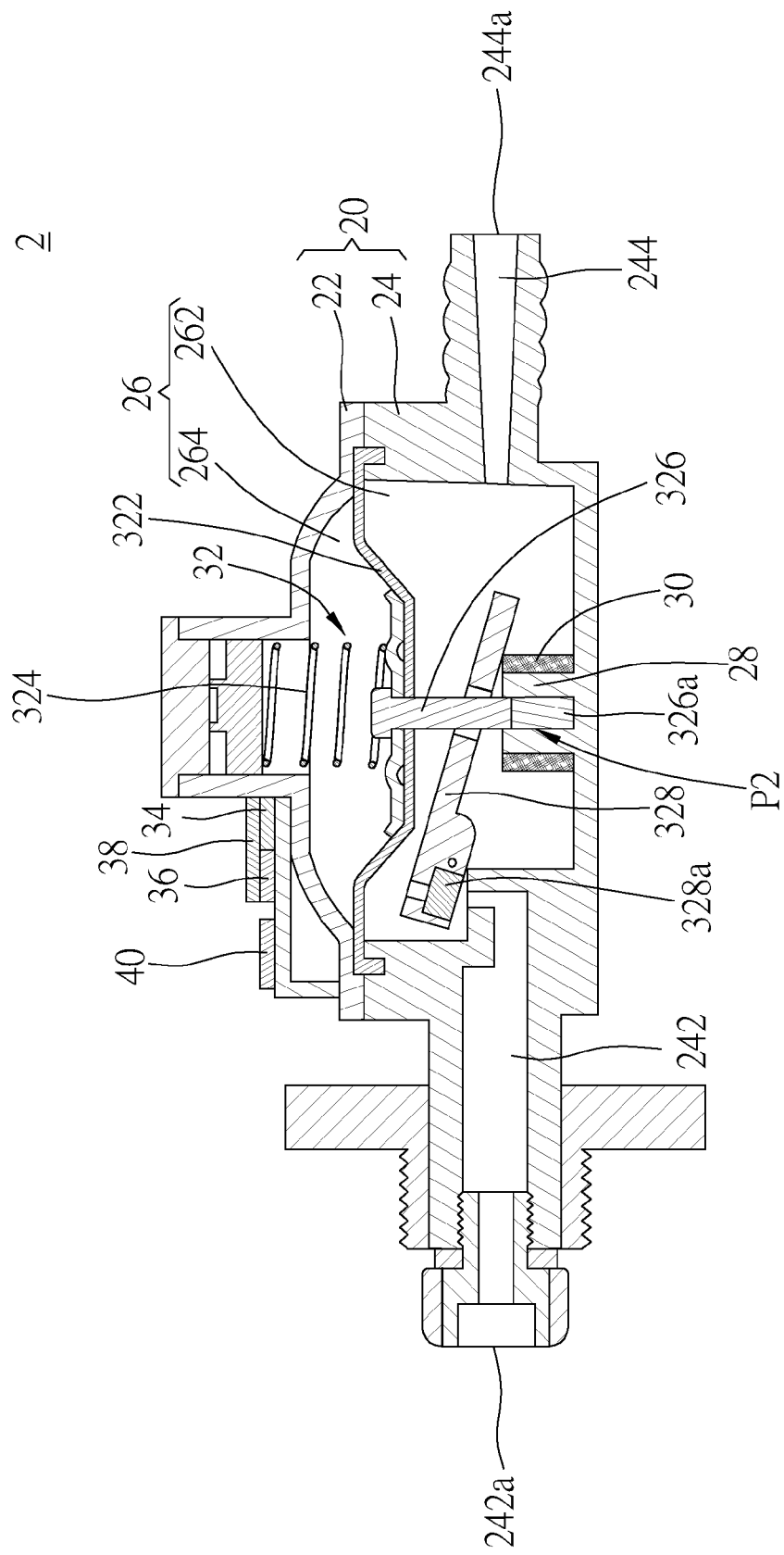
FIG. 3 is a sectional view of the first preferred embodiment of the present invention, showing the magnetic element at the second position.
Figure 4:
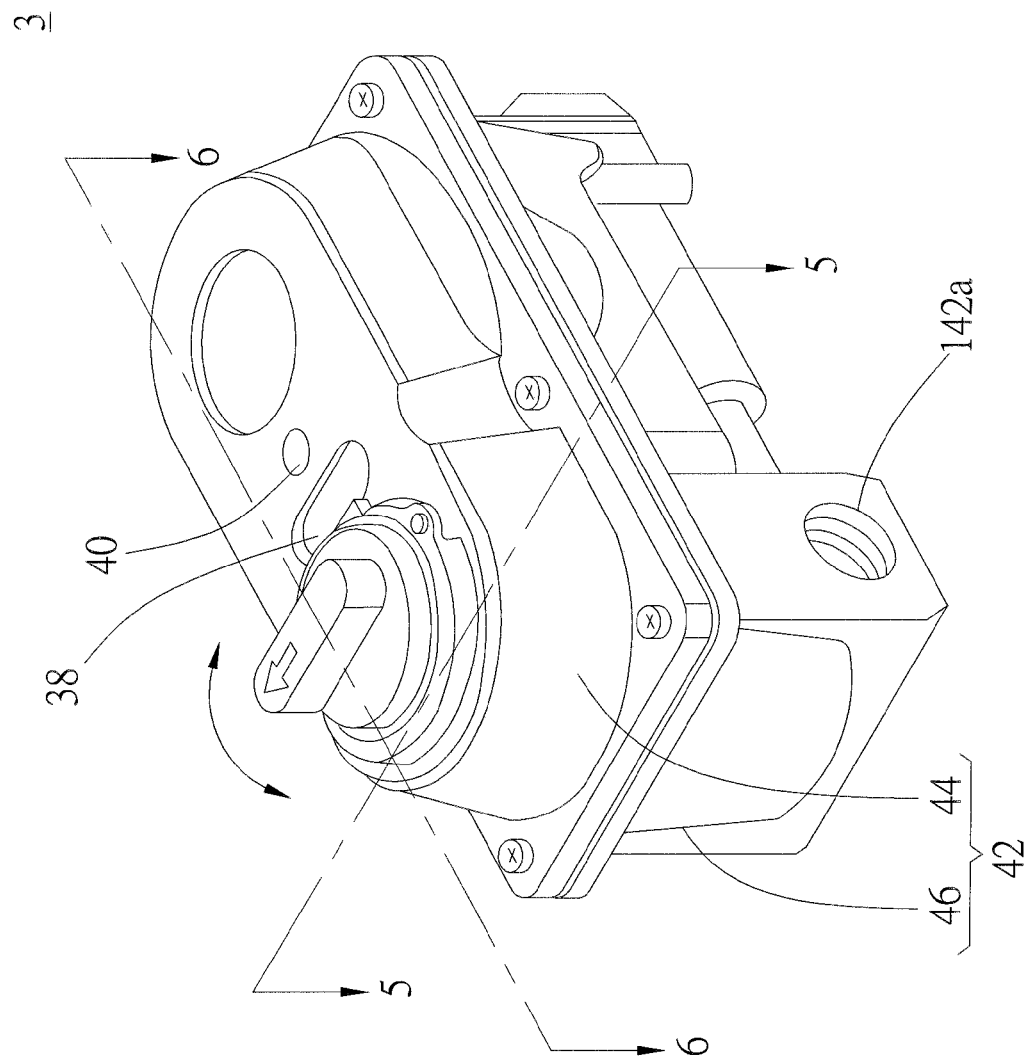
FIG. 4 is a perspective view of the second preferred embodiment of the present invention.
Figure 5:
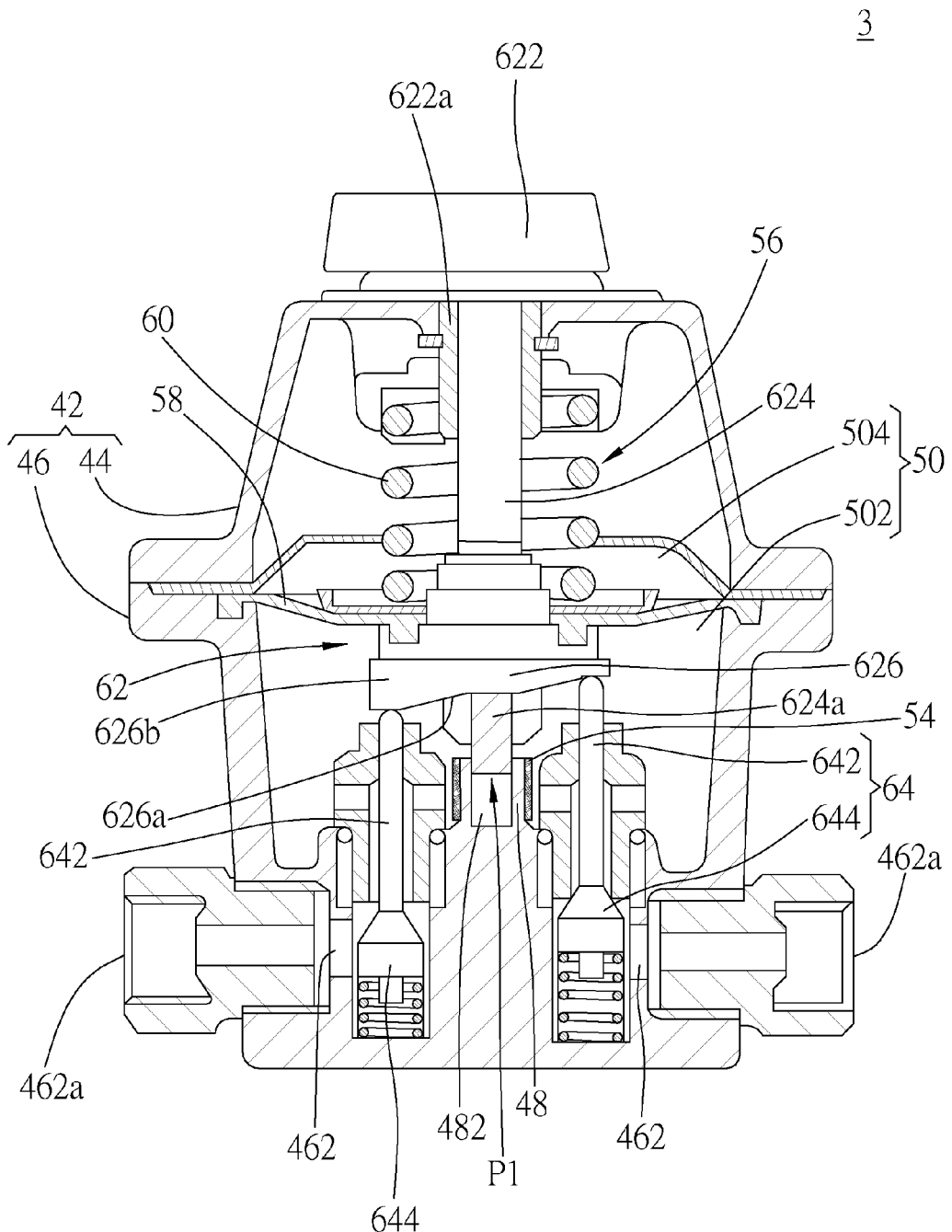
FIG. 5 is a sectional view along the 5-5 line of FIG. 4.
Figure 6:
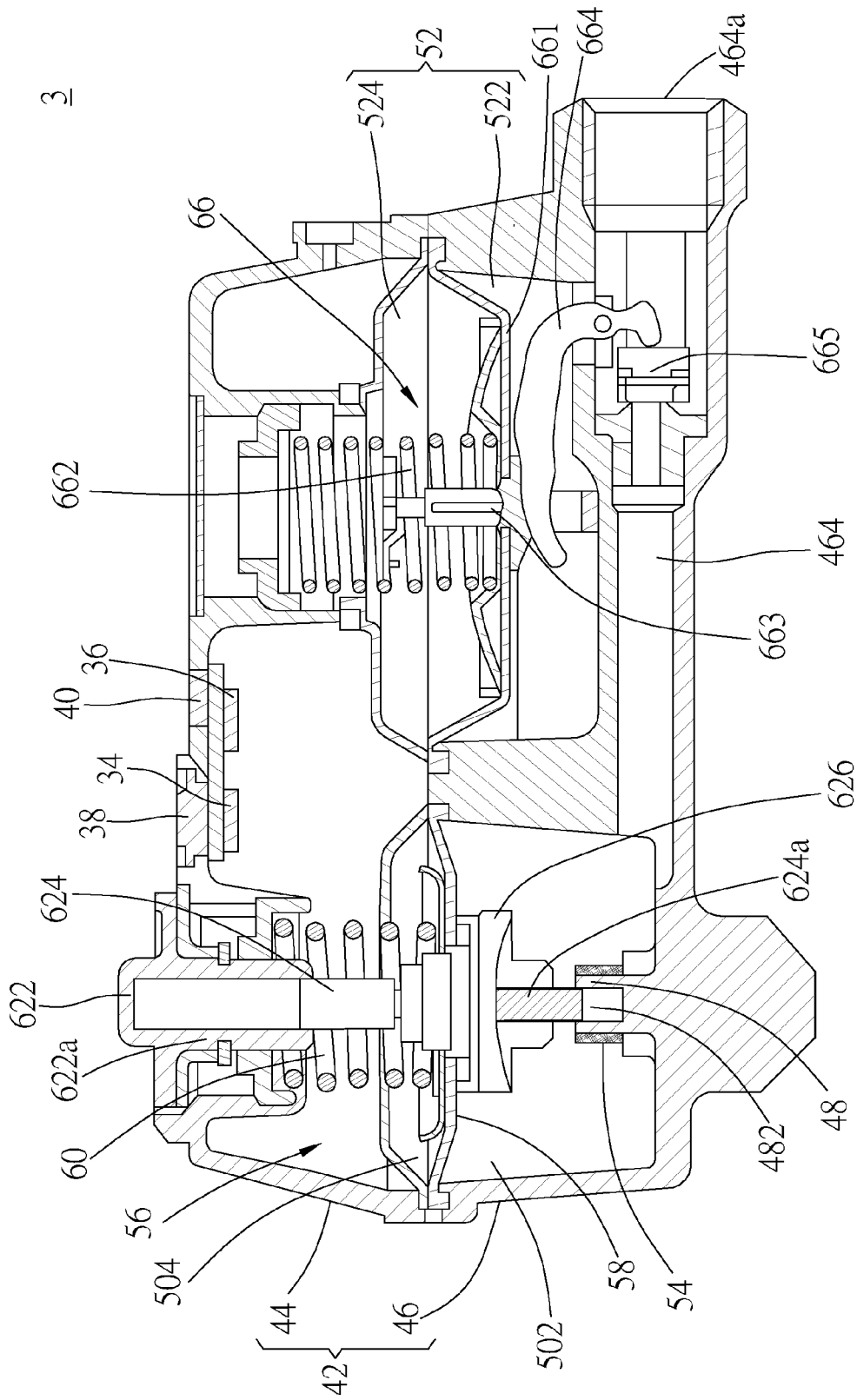
FIG. 6 is a sectional view along the 6-6 line of FIG. 4.

As shown in FIG. 2 and FIG. 3, a gas regulator 2 of the first preferred embodiment of the present invention includes a valve block 20, a metal coil 30, and a pressure regulating assembly 32.

The valve block 20 is composed of a cover 22 and a base 24, and the cover 22 is connected to the base 24 to form a pressure reducing chamber 26 therebetween. The base 24 has an input gateway 242 and an output gateway 244, wherein an end of the input gateway 242 forms an input opening 242a communicated with outside of the valve block 20, and the input opening 242a is used for connecting to a gas source such as a gas barrel (not shown), while the other end of the input gateway 242 is communicated with the pressure reducing chamber 26. An end of the output gateway 244 forms an output opening 244a communicated with a gas appliance (not shown), and the other end thereof is communicated with the pressure reducing chamber 26. In the preferred embodiment, the base 24 has a protrusion thereon as a support post 28, which has an axle hole 282. The metal coil 30 is fitted to the support post 28.

The pressure regulating assembly 32 includes a membrane 322, a spring 324, a movable member 326, and a shielding member 328. The membrane 322 is provided in the pressure reducing chamber 26 to divide the pressure reducing chamber 26 into a first sub-chamber 262 and a second sub-chamber 264, wherein the first sub-chamber 262 communicates the input gateway 242 with the output gateway 244, and the support post 28 is provided in the first sub-chamber 262, hence the metal coil 30 is in the first sub-chamber 262 too. The spring 324 is provided in the second sub-chamber 264 to urge the membrane 322 and the cover 22. The membrane 322 is deformed due to a change of the pressure in the first sub-chamber 262. The movable member 326 is a rod with a magnetic element 326a at an end thereof, and the magnetic element 326a is a magnet received in the axle hole 282 of the support post 28. Therefore the magnetic element 326a is surrounded by the metal coil 30. In practice, the movable member 326 could be made of a magnet. The movable member 326 is connected to the membrane 322, and is moved relatively to the metal coil 30 when the membrane 322 deforms, which moves the magnetic element 326a within the metal coil 30. The shielding member 328 is provided in the first sub-chamber 262, and is pivoted on the base 24. The shielding member 328 is connected to the movable member 326, and the shielding member 328 has a shielding portion 328a corresponding to the input gateway 242. When the membrane 322 deforms because of the change of the pressure in the first sub-chamber 262, the movable member 326 is driven to move the shielding portion 328a of the shielding member 328. As a result, an output gas flow of the input gateway is changed for regulating a gas pressure of a gas flown into the gas appliance.

Since the magnetic element 326a could be moved between a first position P1 (FIG. 2) and a second position P2 (FIG. 3), when a gas pressure of the gas barrel changes, a gas pressure inside the first sub-chamber 262 changes as well, which makes the membrane 322 indirectly move the shielding member 328 for regulating the gas pressure of the gas flown into the gas appliance, and the magnetic element 326a of the movable member 326 is moved at the same time. According to a moving distance and a moving direction of the magnetic element 326a, the metal coil 30 generates a corresponding induced emf. By detecting strength and a direction of the emf, the moving distance and the moving direction of the movable member 326 could be obtained. In other words, changes of the emf could indicate gas pressure changes of the gas barrel. Even there is only slight movement for the magnetic element 326a, the corresponding induced emf could be still generated without exception, which precisely indicates the gas pressure of the gas barrel.

In order to effectively utilize the induced emf generated by the metal coil 30, the gas regulator 2 further includes a processor 34, a wireless signal sending circuit 36, a monitor 38, and a speaker 40 in the first preferred embodiment, and these components are all set on the cover 22. The processor 34 is electrically connected to the metal coil 30, wherein the processor 34 receives the induced emf from the metal coil 30. According to the strength and the direction of the induced emf, the processor 34 could obtain the moving distance and the moving direction of the magnetic element 326a, and therefore obtain a gas pressure value of the gas barrel as well. In other words, if the induced emf generated by the metal coil 30 equals a predetermined voltage, we should able to know that the magnetic element 326a is moved for a certain distance during a certain time period, and the gas pressure changes of the gas barrel is then known too. Whereby, the gas pressure value of the gas barrel could be obtained according to the induced emf generated due to magnetic changes.

The wireless signal sending circuit 36 is electrically connected to the processor 34, and the wireless signal sending circuit 36 converts the gas pressure value obtained by the processor 34 into a wireless signal, which contains the gas pressure value, and then sends the wireless signal out. In practice, an external electronic device could be used to receive the wireless signal, and the gas pressure value could be displayed on a screen of the external electronic device, which provides visual information for a user.

In addition, the processor 34 could keep a critical pressure value, which indicates a bearable limitation. Once the gas pressure of the gas barrel is lower than the critical pressure value, it means that the gas barrel is about to run out of gas. When the gas pressure value obtained by the processor 34 is lower than the critical pressure value, the processor 34 generates a warning signal. Then wireless signal sending circuit 36 converts the warning signal into a wireless signal, which contains the warning signal, and sends the wireless signal to the external electronic device. By this way, the user could be informed that the gas barrel is about to run out of gas, so he/she could prepare a new gas barrel for replacement in advance.

The monitor 38 and the speaker 40 are electrically connected to the processor 34 respectively, wherein the monitor 38 displays the gas pressure value obtained by the processor 34, which allows the user to see the current gas pressure value directly on the gas regulator 2. When the gas pressure value obtained by the processor 34 is lower than the critical pressure value, the speaker 40 makes a sound, which is yet another way to inform the user that the gas barrel is about to run out of gas.

According to the aforementioned description, the gas pressure changes of the gas source could deform the membrane 322 to move the movable member 326, and therefore move the magnetic element 326a within the metal coil 30 to generate the corresponding induced emf, which is able to indicate the gas pressure changes of the gas source. With the processor 34, the wireless signal sending circuit 36, the monitor 38, and the speaker 40, the induced emf could be further converted into the gas pressure value to inform the user.

In practice, the support post 28 and the metal coil 30 could be provided in the second sub-chamber 264, and the magnetic element 326a of the movable member 326 is provided in the second sub-chamber 264 as well. In this way, the magnetic element 326a could be extended into the axle hole 282 of the support post 28, and could be moved relatively to generate the corresponding induced emf.

In the first preferred embodiment, the gas regulator 2 has the pressure reducing chamber 26, but this is not a limitation of the present invention. As shown in FIG. 4 to FIG. 7, a gas regulator 3 of the second preferred embodiment has a similar structure with the first preferred embodiment, which includes a valve block 42, a metal coil 54, a first pressure regulating assembly 56, and a second pressure regulating assembly 66.

The valve block 42 includes a cover 44 and a base 46, wherein the cover 44 is connected to the base 46 to form a first pressure reducing chamber 50 and a second pressure reducing chamber 52 therebetween. The base 46 has two input gateways 462 and an output gateway 464. An end of each input gateway 462 forms an input opening 462a communicated with a gas source such as a gas barrel (not shown), and the other end of each input gateway 462 is communicated with the first pressure reducing chamber 50. An end of the output gateway 464 forms an output opening 464a communicated with a gas appliance (not shown), and the other end thereof is communicated with the first pressure reducing chamber 50. The output gateway 464 is also communicated with the second pressure reducing chamber 52. The base 46 has a protrusion thereon as a support post 48, which has an axle hole 482. The metal coil 54 is fitted to the support post 48.

Figure 7:
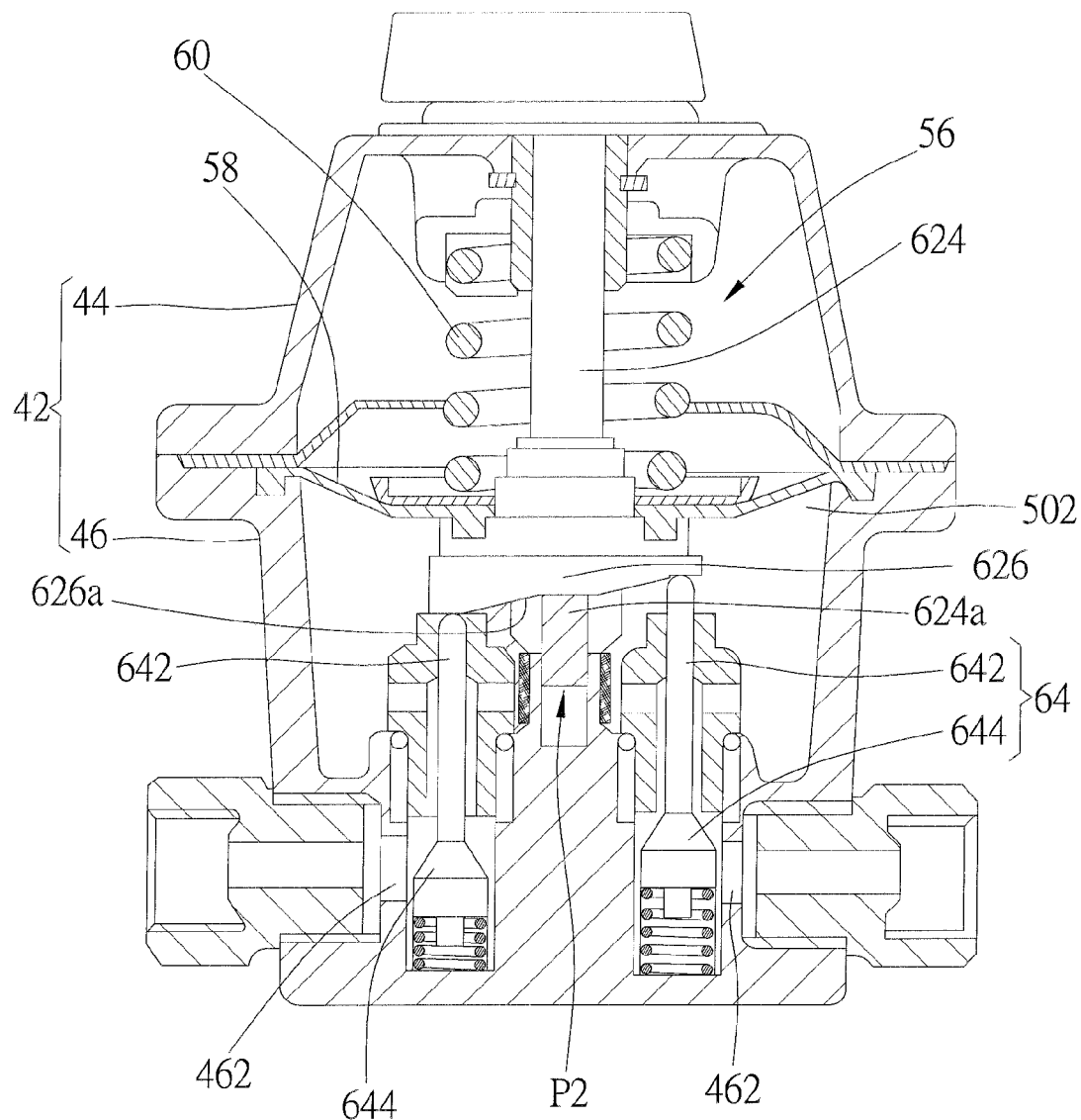
FIG. 7 is a sectional view of the second preferred embodiment of the present invention, showing the magnetic element at the second position.

The first pressure regulating assembly 56 includes a membrane 58, a spring 60, a movable member 62, and two shielding members 64. The membrane 58 divides the first pressure reducing chamber 50 into a first sub-chamber 502 and a second sub-chamber 504, wherein the first sub-chamber 502 communicates the input gateways 462 and the output gateway 464. The support post 48 is provided in the first sub-chamber 502, and the spring 60 urges the membrane 58 and the cover 44. The movable member 62 in the second preferred embodiment includes a knob 622, a guide rod 624, and a rotary disc 626, wherein the knob 622 is set on the cover 44, and can be turned relatively to the cover 44. The knob 622 has a hub 622a provided in the second sub-chamber 504. The guide rod 624 is connected to the membrane 58, wherein an end of the guide rod 624 is inserted into the hub 622a, and the other end thereof has a magnetic element 624a received in the axle hole 482 of the support post 48. The guide rod 624 is moved by the membrane 58, which makes the magnetic element 624a move between a first position P1 (FIG. 5) and a second position P2 (FIG. 7). The rotary disc 626 is round, which is provided in the first sub-chamber 502, and is connected to the guide rod 624. The rotary disc 626 has a surface 626a, and the surface 626a has a protrusion 626b thereon.

Each shielding member 64 includes a pin 642 and a plug 644, wherein an end of each pin 642 is connected to each plug 644, and the other end thereof touches the surface 626a of the rotary disc 626. Each plug 644 is received in the corresponding input gateway 462. When the magnetic element 624a is moved to the first position P1, and once the knob 622 is turned by the user, the rotary disc 626 is rotated, and the protrusion 626b pushes the two pins 642 respectively to make the plugs 644 seal or unseal the corresponding input gateway 462. The first pressure regulating assembly 56 changes an output gas flow of one of the input gateway 462 with the plugs 644, which could regulate a gas pressure of the first sub-chamber 502.

As shown in FIG. 7, the gas pressure of the first sub-chamber 502 is lowering while one of the gas barrels is running out of gas, and the spring 60 urges the membrane 58 to gradually move the magnetic element 624a of the guide rod 624 toward the second position P2. At the same time, the surface 626a of the rotary disc 626 pushes the pins 642 of the two shielding member 65 to open the two input gateways 462 simultaneously, which makes the other gas barrel provide gas continuously. After the two input gateways 462 both are opened, the first pressure regulating assembly 56 could still regulate the gas pressure of the first sub-chamber 502 by changing the output gas flow of the two input gateways 462 with the two plugs 644.

The second pressure regulating assembly 66 includes a membrane 661, a spring 662, an axle rod 663, a linkage 664, and a stop 665. The membrane 661 divides the second pressure reducing chamber 52 into a third sub-chamber 522 and a fourth sub-chamber 524. The third sub-chamber 522 is communicated with the output gateway 464, and the spring 662 pushes the membrane 661 and the cover 44. The axle rod 663 is connected to the membrane 661. The linkage 664, which has two ends, is pivotally connected to the base 46 with a portion between the two ends thereof, wherein one of the ends of the linkage 664 is connected to the axle rod 663, and the other end thereof is connected to the stop 665. The stop 665 is inside the output gateway 464. Whereby, when a gas pressure of the third sub-chamber 522 is changing, the membrane 661 is deformed to move the stop 665, which changes an output gas flow of the output gateway 464 to regulate gas pressures of gas flow into the gas appliance.

With aforementioned structure, while the magnetic element 624a of the movable member 62 is moved between the first position P1 and the second position P2, the metal coil 54 generates a corresponding induced emf because of the magnetic element 624a. As the description about the first preferred embodiment, a moving distance and a moving direction of the magnetic element 624a could be obtained according to changes of the induced emf, which indicates gas pressure changes of the two gas barrels. In addition, the processor 34, the wireless signal sending circuit 36, the monitor 38, and the speaker 40 are set on the cover 44 of the gas regulator 3 as in the first preferred embodiment. Therefore, the induced emf could be converted into a gas pressure value of the two gas barrels, and the user could be informed.

With the aforementioned designs, the present invention could precisely determine the moving distance and the moving direction of the magnetic elements according to the induced emf generated between the magnetic elements and the metal coils in the two preferred embodiments, which indicates the gas pressure changes of the gas sources. As a result, the gas regulators 2 and 3 could not only regulate gas pressures, but also indicate the gas pressure changes of the gas sources.

It must be pointed out that the embodiments described above are only some preferred embodiments of the present invention. All equivalent structures which employ the concepts disclosed in this specification and the appended claims should fall within the scope of the present invention.

What is claimed is:

1. A gas regulator, which is set between a gas source and a gas appliance, comprising:
    a valve block including an input gateway, an output gateway, and a pressure reducing chamber, wherein the input gateway communicates with the gas source, and the output gateway communicates with the gas appliance;
    a membrane provided in the pressure reducing chamber, which divides the pressure reducing chamber into a first sub-chamber and a second sub-chamber, wherein the first sub-chamber communicates the input gateway with the output gateway, and the membrane deforms due to a change of a pressure in the first sub-chamber;
    a metal coil provided in either the first sub-chamber or the second sub-chamber;
    a movable member having a magnetic element received in the metal coil, wherein the movable member is connected to the membrane, and is moved relatively to the metal coil when the membrane deforms;
    a shielding member provided in the first sub-chamber, wherein the shielding member is moved by the membrane to change an output gas flow of the input gateway; and
    a processor electrically connected to the metal coil, wherein the processor receives an induced emf generated by the metal coil to obtain a gas pressure value of the gas source.

2. The gas regulator of claim 1, wherein the shielding member is connected to the movable member.

3. The gas regulator of claim 1, wherein the valve block has a support post provided in the first sub-chamber, and the support post has an axle hole; the metal coil is fitted to the support post, and the magnetic element of the movable member is extended into the axle hole.

4. The gas regulator of claim 1, further comprising a wireless signal sending circuit electrically connected to the processor, wherein the wireless signal sending circuit converts the gas pressure value obtained by the processor into a wireless signal, which contains the gas pressure value, and then sends the wireless signal out.

5. The gas regulator of claim 1, further comprising a wireless signal sending circuit electrically connected to the processor, wherein the gas pressure values obtained by the processor is compared with a critical pressure value, and when the gas pressure values is lower than the critical pressure value, the processor generates a warning signal, and the wireless signal sending circuit converts the warning signal into a wireless signal, which contains the warning signal, and then sends the wireless signal out.

6. The gas regulator of claim 1, further comprising a monitor electrically connected to the processor, wherein the monitor shows the gas pressure value obtained by the processor.

7. The gas regulator of claim 1, further comprising a speaker electrically connected to the processor, wherein the gas pressure values obtained by the processor is compared with a critical pressure value, and when the gas pressure values is lower than the critical pressure value, the processor controls the speaker to make a sound.

8. A gas regulator, which is set between a gas source and a gas appliance, comprising:
- a valve block including an input gateway, an output gateway, and a pressure reducing chamber, wherein the input gateway communicates with the gas source, and the output gateway communicates with the gas appliance;
- a membrane provided in the pressure reducing chamber, which divides the pressure reducing chamber into a first sub-chamber and a second sub-chamber, wherein the first sub-chamber communicates the input gateway with the output gateway, and the membrane deforms due to a change of a pressure in the first sub-chamber;
- a metal coil provided in either the first sub-chamber or the second sub-chamber;
- a movable member having a magnetic element received in the metal coil, wherein the movable member is connected to the membrane, and is moved relatively to the metal coil when the membrane deforms; and
- a shielding member provided in the first sub-chamber, wherein the shielding member is moved by the membrane to change an output gas flow of the input gateway;
- wherein the valve block has a support post provided in the first sub-chamber, and the support post has an axle hole; the metal coil is fitted to the support post, and the magnetic element of the movable member is extended into the axle hole.

9. The gas regulator of claim 8, wherein the shielding member is connected to the movable member.

* * * * *